United States Patent [19]

Andrews, Jr. et al.

[11] 3,816,674

[45] June 11, 1974

[54] TELEPHONE SYSTEM TROUBLE ANALYZER

[75] Inventors: Stephen Stewart Andrews, Jr.; Louis Gawron, Jr., both of Reynoldsburg; Gary John Meidl, Columbus, all of Ohio

[73] Assignee: Western Electric Company Incorporated, New York, N.Y.

[22] Filed: Aug. 8, 1973

[21] Appl. No.: 339,369

[52] U.S. Cl. ........................ 179/175.2 R, 340/172.5

[51] Int. Cl. ........................ H04m 3/26

[58] Field of Search .............. 179/175.2 R, 175.2 C; 340/172.5

[56] References Cited

UNITED STATES PATENTS

| | | | |
|---|---|---|---|
| 2,878,328 | 3/1959 | Gohorel | 179/175.2 R |
| 3,030,609 | 4/1962 | Albrecht | 340/172.5 |
| 3,448,436 | 6/1969 | Machol | 340/172.5 |
| 3,626,383 | 12/1971 | Oswald | 179/175.2 R |
| 3,647,971 | 3/1972 | Cushman et al. | 179/2 A |

*Primary Examiner*—William C. Cooper
*Assistant Examiner*—Douglas W. Olms
*Attorney, Agent, or Firm*—C. H. Davis

[57] ABSTRACT

A telephone trouble reporting system is disclosed wherein various units of telephone equipment transmit trouble indications to a trouble recorder so that the troubles may be stored in memory and displayed on a lamp panel. A sender associated with the trouble recorder reads the memory and converts the trouble indications into multifrequency signals which are transmitted to a magnetic tape recorder.

A trouble analyzer and display circuit is provided at a maintenance center for analyzing troubles on previously recorded tapes or troubles received directly from the sender. The trouble analyzer and display comprises a light emitting diode matrix for visually displaying the trouble indications. A particular trouble can be designated for analysis by actuating a plurality of selector switches to select the coordinates of light emitting diodes that are peculiar to the designated trouble. After the trouble indication is displayed a sequence circuit interrogates each selector switch to determine if its setting "matches" an energized light emitting diode. A counter is incremented for each match and upon detecting a predetermined number of matches the circuit can be arranged to lock in the displayed troubles.

The telephone equipment can also be controlled from the maintenance center by setting a plurality of switches at the maintenance center to the desired control function. The control information is transmitted to the switching center in multifrequency format where it is translated into signals for performing a control function, such as making a trunk busy. When the control function has been performed the trouble recorder reports back to the trouble analyzer and display, the status of the telephone equipment.

21 Claims, 15 Drawing Figures

PATENTED JUN 11 1974

3,816,674

PATENTED JUN 11 1974

3,816,674

SHEET 09 OF 13

TELEPHONE SYSTEM TROUBLE ANALYZER

FIELD OF THE INVENTION

Most telephone switching systems are designed to function relatively trouble free; however, when trouble does occur, it is essential that the maintenance personnel be apprised of the equipment failures so that corrective action can be taken. Automatic switching systems are therefore frequently equipped with some sort of monitoring apparatus which maintains a continuous surveilance of the various units of switching equipment. When a trouble is detected in a switching system, the monitoring apparatus records the trouble condition in a form that can be readily analyzed by the maintenance personnel.

BACKGROUND OF THE INVENTION

While many trouble recording and analyzing systems have been proposed in the prior art, these systems lack certain features which have been incorporated in the proposed arrangement.

One typical prior art trouble reporting arrangement comprises a large lamp display panel. The lamps on the panel represent various units of switching equipment and the status of the equipment. Thus, if a trouble is encountered in processing a telephone call, the lamps are selectively lighted to indicate which units of equipment were engaged on the call and how far the call had progressed before experiencing trouble. With the prior art lamp display panel arrangement, a permanent trouble record was made by having someone write down the designations of the lighted lamps for each trouble. This, of course, was a lengthy process and during the recording of one trouble condition, the display panel was unavailable to indicate other troubles.

Instead of lighting lamps on a display panel, other prior art trouble reporting arrangements record trouble conditions by punching a series of cards or a continuous paper tape. Although these arrangements have the advantage of being able to rapidly record a series of troubles, the recording media must still be read by the maintenance personnel to analyze each trouble. This becomes more difficult in the case of paper tapes which are generally read by slowly running them through a special reading mask.

It is therefore one object of our invention to provide a flexible and efficient trouble reporting arrangement for a telephone system. It is a further object of our invention to provide a trouble reporting arrangement which has the capability of permanently recording troubles while informing the maintenance personnel when preselected troubles are encountered.

Another object of our invention is to provide a trouble reporting arrangement for a telephone system which has the capability of reporting trouble conditions to a location remote from the telephone system.

SUMMARY OF THE INVENTION

These and other objects are attained in the one illustrative embodiment of the invention wherein the indications of trouble conditions at a telephone switching office are converted into multifrequency signals for transmission to a trouble analyzer and display circuit. The trouble analyzer and display circuit comprises a memory matrix having a light emitting diode at each intersection. The light emitting diodes are selectively energized in accordance with the multifrequency signals received to visually display the trouble condition.

The trouble analyzer is arranged to detect particular trouble conditions which are manifested by a combination of energized light emitting diodes. This is accomplished by a matching circuit which matches the energized light emitting diodes with the matrix intersections that are selected by a plurality of coordinate selectors. After the trouble condition is displayed, the coordinate selectors are sequentially interrogated to ascertain if a match condition exists for each selector. The number of matches are counted and if a predetermined number exist, action is taken to inform the maintenance personnel that a particular trouble has been recorded.

BRIEF DESCRIPTION OF THE DRAWING

A better understanding of the arrangement contemplated will be had with the following description made with reference to the drawing in which:

More specifically, FIG. 4 shows a tape recorder and a multifrequency detector which receives the multifrequency tones from the tape recorder or from the trouble reporting equipment at the switching system. FIGS. 5 and 6 show a two-out-of-six-to-octal code converter and some of the control logic for the arrangement. FIG. 7 shows the shift registers which form a serial-to-parallel converter circuit for energizing the matrix that is shown in FIG. 10. FIG. 8, on the other hand, shows advance circuitry and a decoder for ascertaining the message length. FIG. 9 shows the circuitry for controlling the entry of information in the proper rows and columns of the matrix. FIG. 11 shows the coordinate selector switches and the sequencer for interrogating the switches while FIG. 12 shows the horizontal and vertical enabling circuitry for the matching circuit. FIGS. 13 and 14 show the match counter circuitry and the numeric display units.

Figures 1, 3:
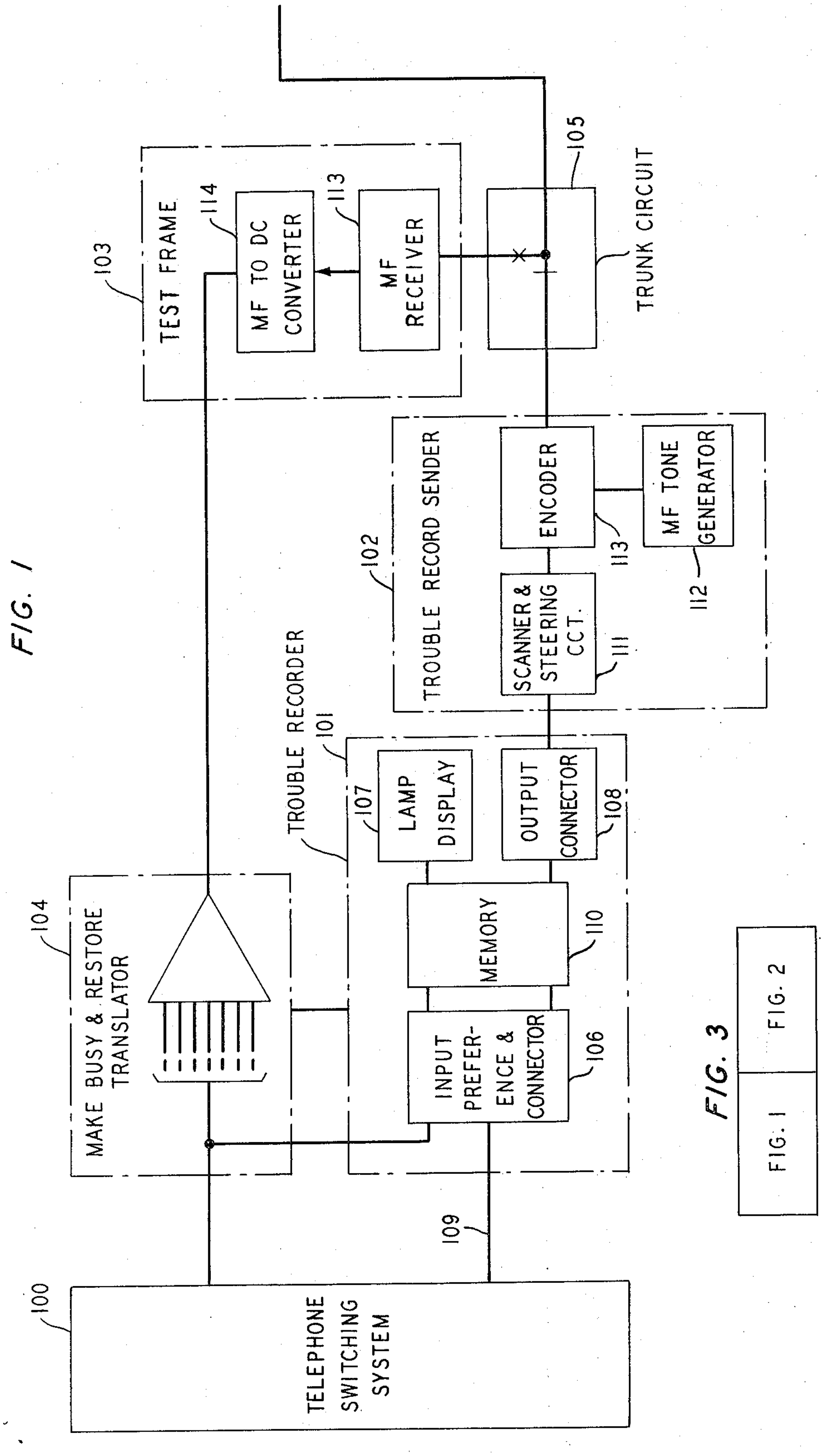
FIGS. 1 and 2 when arranged in accordance with FIG. 3 show a block diagram of the trouble reporting and analyzing system.

Whenever possible the apparatus has been given a combined number and letter reference designation. The number preceding the letter designation indicates the figure of the drawing in which the apparatus appears and the letters are generally abbreviations of the function of the apparatus. The contacts of relay are given the same reference designations as their windings followed by the contact number.

BRIEF DESCRIPTION OF THE ARRANGEMENT

Figure 2:
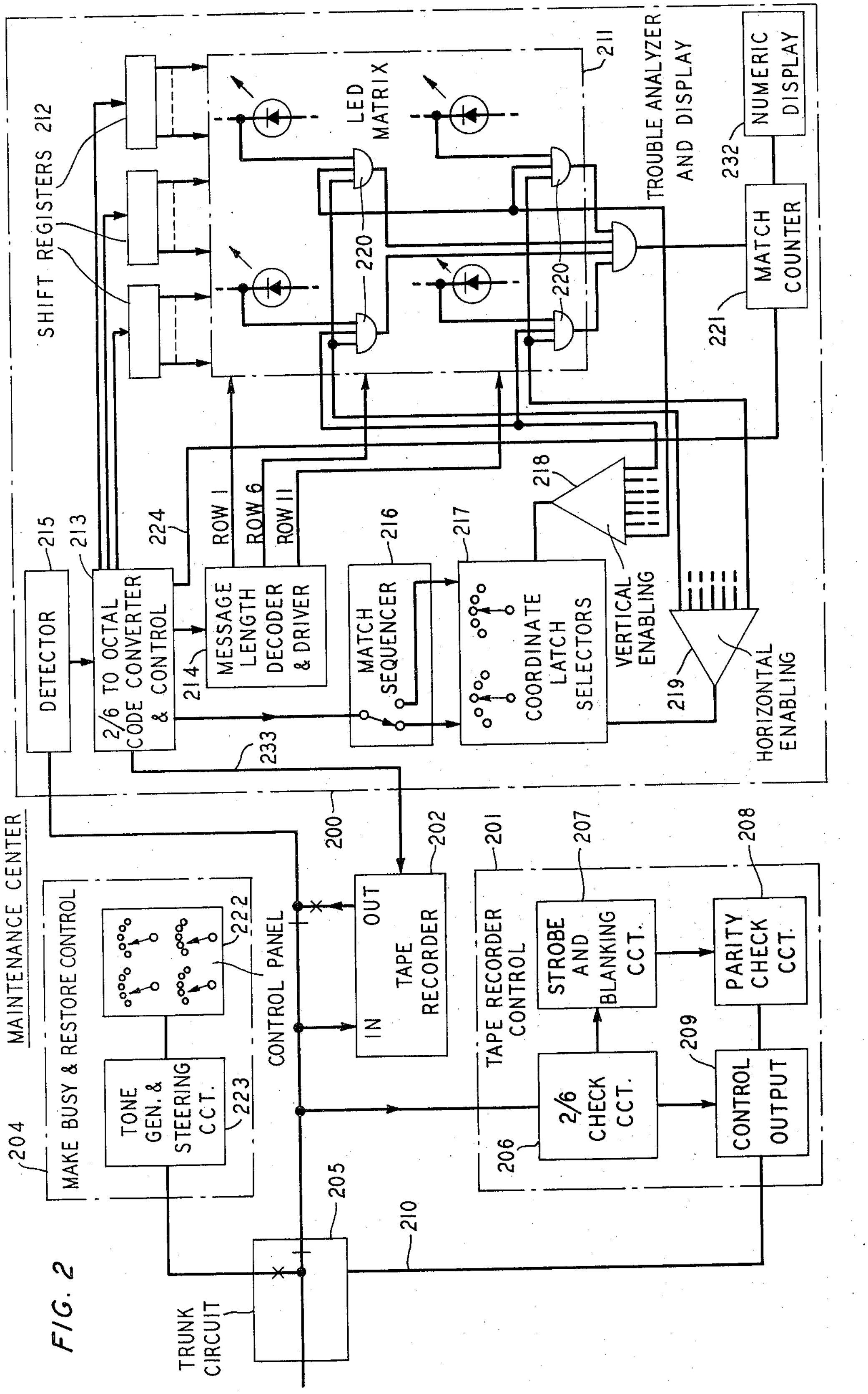

The overall trouble reporting and analyzing system is disclosed in block diagram form in FIGS. 1 and 2. FIG. 1 shows the apparatus associated with the telephone switching system while FIG. 2 shows the apparatus associated with a maintenance center. The maintenance center can, of course, be located with the switching system or at a remote location.

The equipment associated with the switching system 100 comprises trouble recorder 101, trouble record sender 102, test frame 103, and make busy and restore translator 104. These equipments are connected via trunk circuit 105 to the maintenance center. The maintenance center equipment comprises a trouble analyzer and display 200, a tape recorder 202, a tape recorder control 201 and a make busy and restore control 204 which are coupled to the switching system equipment via trunk circuit 205.

As mentioned above, switching system 100 comprises many units of common control equipment which may encounter a trouble condition that requires recording. Each unit of common control equipment must be able to identify itself and indicate to the maintenance personnel the nature of its trouble condition. This is accomplished by transmitting binary signals over a plurality of conductors 109 to trouble recorder 101. These signals may represent, in part, the identity of the common equipment requesting a trouble record, the progress that the equipment made on the call before it encountered trouble and the identity of other units of equipment engaged on the call such as, calling line, called line, trunk number, sender number, etc.

Trouble recorder 101 comprises an input preference and connector circuit 106, a lamp display panel 107, an output connector 108 and a memory 110. Input preference and connector 106 is provided to give preference to one of the common control units requesting a trouble record. Upon given preference, the trouble recorder accepts and stores in memory 110, the various binary signals received over conductors 109.

Memory 110 furnishes the necessary signals to selectively light a plurality of lamps on a local display panel 107. Display panel 107 is similar to many prior art display panels and indicates the nature of the trouble by a series of lighted status and progress lamps. If the trouble indication is to be transmitted to the trouble analyzer and display in FIG. 2, the information is selectively gated through output connector 108 by trouble record sender 102.

Trouble record sender 101 comprises a scanner and steering circuit 111, a multifrequency tone generator 112 and encoder 113. When trouble recorder 101 records the trouble in its memory 110, it releases the telephone switching equipment in system 100 and requests service by sender 102. Upon seizure, sender 102 turns on multifrequency tone generator 112 and closes a loop to trunk circuit 105 which, in turn, signals trunk circuit 205 at the maintenance center. Sender 102 then transmits a key pulse (KP) signal to activate the trouble analyzer and display 200 and tape recorder 202. Sender 102 then waits an appropriate time interval to permit tape recorder 202 to reach its proper recording speed before the trouble message is sent.

The system disclosed herein has the capability of transmitting messages of different lengths in order to report different kinds of trouble. Each message, however, begins with a KP signal followed by a length of message signal. The length of the body or data portion of the message may vary but this is always followed by the time of day information and a start pulse (ST) signal. The length of message signal is determined by which unit of common control equipment in switching system 100 requested a trouble recording and in this system being described, three lengths of trouble messages are being used.

After the message length is sent, scanner and steering circuit 111 scans memory 110 via output conenctor 108 to transfer portions of the trouble message to encoder 113. The trouble message is transferred by scanning in groups of three, the memory cells of memory 110. The combination of signals received from memory 110 is converted to octal code and then converted to two-out-of-six multifrequency signals from generator 112. At the end of the message, a combination of frequencies representing a start pulse is sent. If the message is received at the maintenance center, a supervisory signal is returned back over trunk 105 causing trouble record sender 102 to release.

When a KP signal is received at the maintenance center equipment in FIG. 2, a circuit is closed in tape recorder control 201 to turn on tape recorder 202. Tape recorder 202 can be any type of tape recorder using a magnetic tape.

Tape recorder control 201 comprises a two-out-of-six check circuit 206, a strobe and blanking circuit 207, a parity check circuit 208, and an output and control circuit 209. Two-out-of-six check circuit 206 converts the analog signals to digital and then determines that two and only two of the six signals have been received. The decoded outputs are fed into strobe and blanking circuits 207 which measure the pulse width and spacing to ascertain if the received pulses are within the allowable limits. The parity check circuit 208 then determines if a valid message is being received by counting the number of pulses. If the correct number of pulses are counted by parity check circuit 208 and a start pulse is detected by two-out-of-six check circuit 206, the control and output circuit 209 transmits a signal over conductor 210 to trunk circuit 205. Trunk circuit 205 returns a supervisory signal to trouble record sender 102 informing the trouble record sender that the trouble message has been received and trouble record sender 102 can now release.

At this point the trouble record has been displayed at the switching center on lamp display 107 and has been recorded on tape recorder 202 in the form of multifrequency signals.

In accordance with one feature of our invention, a trouble condition can also be displayed and analyzed using trouble analyzer and display 200. Trouble analyzer and display 200 can be used to display and analyze trouble in real time, that is, as each trouble occurs in the switching system and is being recorded in recorder 202 or by playing back the previously taped trouble records that have been accumulated in tape recorder 202.

Trouble analyzer and display 200 can be functionally divided into apparatus for visually displaying the trouble indications and apparatus for analyzing the displayed trouble. The display apparatus comprises a memory matrix 211, shift registers 212, two-out-of-six-to-octal code converter and control 213, message length decoder and driver 214, and detector 215. The analyzing apparatus comprises match sequencer 216, coordinate latch selectors 217, vertical and horizontal enabling circuits 218 and 219, numeric display 232 and match counter 221.

In order to understand the operation of the trouble analyzer and display, let it be assumed that a trouble message is being received by detector 215. The trouble message can be received via trunk 205 directly from trouble record sender 102 or by playing back a tape on recorder 202.

Detector 215 comprises amplifiers, filters and output circuits to convert the two-out-of-six multifrequency tones into direct current signals. The direct current signals are applied to code converter 213 which converts each combination of two-out-of-six signals into a three bit octal code. The output code of converter 213 is then applied to the three shift registers 212 and to message length decoder and driver 214. Shift registers 212 comprise a serial-to-parallel converter which stores the pulses of the octal code until sufficient pulses have been received to enter into a row of binary latches in memory matrix 211. The information is gated into the memory under control of message length decoder and driver 214. Message length decoder and driver 214 also decodes the message length signal to steer the information into the proper memory locations for messages of different lengths. For example a long length message would be gated into the memory beginning at row 1 while a medium length message would begin at row 6. A short message, on the other hand, would be gated into rows 11 and 12.

The memory matrix in this particular embodiment comprises a coordinate array of light emitting diodes arranged in 12 rows having 30 diodes in each row. The diodes are energized by binary latches (not shown) and when energized, the diodes are visually perceptible to indicate the recorded trouble in a manner similar to the lamp display 107 in FIG. 1.

The analyzer can be set to recognize particular troubles in order to count the number of times a trouble condition occurs and to alert maintenance personnel upon the receipt of a particular trouble. This is accomplished by a plurality of coordinate latch selectors 217 which can be set to select any light emitting diode in memory 211. In this embodiment six sets of selector switches are used and these are actuated in accordance with the horizontal and vertical coordinates of a particular light emitting diode in matrix 211. At the end of the trouble message, match sequencer 216 is actuated to sequentially interrogate each coordinate latch selector. The outputs of each coordinate selector in terms of a horizontal and vertical indication are matched in matching circuitry 220 with the corresponding light emitting diode. If the light emitting diode selected by coordinate selectors 217 is energized, a match signal is sent to match counter 221. Match counter 221 counts the number of matches that occur during a particular trouble message and if a predetermined number of matches occur, a numeric display totalizer 232 is advanced.

Trouble analyzer and display 200 can also be arranged to "stop on match." In this mode of operation the display will "lock in" the recorded trouble and stop tape recorder 202 if the trouble messages are being read from a prerecorded tape. If the trouble messages are being received in real time from switching system 100, the displayed trouble will be locked in, but the tape recorder 202 will still be available to record additional troubles received from the switching system. Thus, when a match is detected a signal is transmitted over conductor 224 to block the transmission of further messages to message length decoder 214. Signals are also transmitted over conductor 233 to control the tape recorder.

In the above description the apparatus was described in its operating mode for displaying, recording and analyzing trouble conditions that occur in telephone switching system 100. This apparatus and additional apparatus which will now be described are also used for controlling switching system 100 from the maintenance center. These controls might include making switching equipment busy, restoring equipment to service, changing routing instructions, conducting maintenance test, etc. To illustrate the operation of this apparatus let it be assumed that a trunk at switching system 100 is to be made busy from the maintenance center.

Each control function to be implemented from the maintenance center is assigned a three-digit number which is entered on control panel 222 of make busy and restore control circuit 204. Control panel 222 comprises a plurality of code point switches which can be set on a three-digit code to select one of 300 points. Other switches are also provided which select the nature of the control function to be performed. In this example, a make busy switch would be actuated along with the code point switches.

The make busy control apparatus in this embodiment shares the same dedicated facilities, namely trunks 105 and 205, as the trouble recording apparatus, and steps must be taken to prevent the trouble record sender from transmitting a trouble message during the interval that a control message is to be sent to the switching center. This is accomplished by equipment not shown in detail herein, but briefly, the testman dials a test line which is located at the switching system 100 to temporarily remove the trouble recorder from normal service. Signals are returned to the testman over the dialed connection to indicate if the trouble recorder is in the process of taking a trouble record or if it is idle and can be removed from service.

Once trouble recorder 101 is removed from service, the testman actuates a start key. The information set up on control panel 222, is converted into multifrequency tones by tone generator and steering circuit 223 and is then transmitted via trunks 205 and 105 to test frame 103.

Test frame 103 comprises a multifrequency receiver 113 which detects the two-out-of-six multifrequency tones and a converter 114 which converts the multifrequency tones to direct current signals which are transmitted to translator 104. Translator 104 translates the two-out-of-six-D.C. signals representing the three digits of the selected equipment and the signals representing the make busy order into signals which actuate a make busy relay in the designated trunk.

The message sent to perform the control operation in switching system 100 is similar to a trouble message in that it is preceded by a KP pulse and is followed by an ST pulse. Upon receipt of the ST pulse, translator 104 is prepared for releasing, but before releasing, translator 104 bids for trouble recorder 101 and connects all of its code points to the trouble recorder. The trouble recorder can now proceed to transmit a trouble message to the maintenance center in the manner described above. However, in this case, the message will energize the light emitting diodes in accordance with the status of the various code points. By examining the light emitting diode matrix, the testman can ascertain whether or not the selected trunk has been made busy as ordered by the control message.

DETAILED DESCRIPTION

Turning now to FIGS. 4-14 when arranged according to FIG. 15, a more detailed description will now be given of the trouble analyzer and display.

As mentioned above, this circuit provides the necessary means for displaying and analyzing trouble messages which are received in the form of analog multifrequency signals either from a trouble record sender at a switching office or from the playback of a prerecorded tape. The decoded signals are displayed on a memory matrix shown in FIG. 10.

The memory matrix in this illustrative embodiment comprises a 12 × 30 array of light emitting diodes but since the system responds to different length messages, not all light emitting diodes are utilized on each message. The light emitting diodes are arranged on a display panel in 12 horizontal rows with 30 light emitting diodes in each row. Associated with each intersection of the horizontal and vertical coordinates are a light emitting diode, such as 10GA001 and a bistable latch, such as 10LO1RO1. The bistable latches will reflect on their output, the input signal from a shift register whenever the latch is clocked by a pulse on conductors 01C1–1 through 12C1–1 and 01C2–1 through 12C2–1. Since the clock pulse presented to the latch is the output of a counter only one row of latches will respond at a time.

Figure 5:
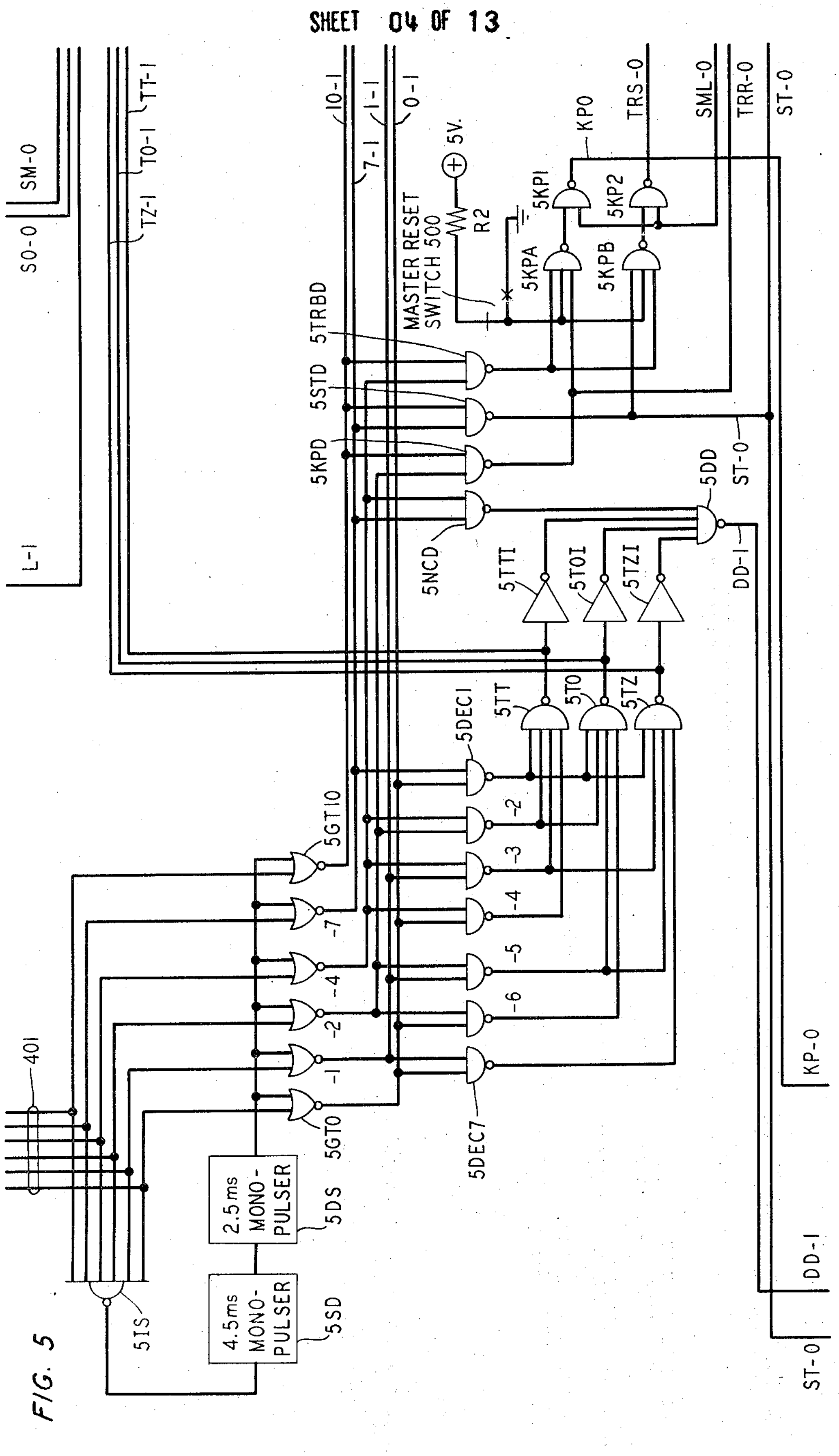
Figure 6:
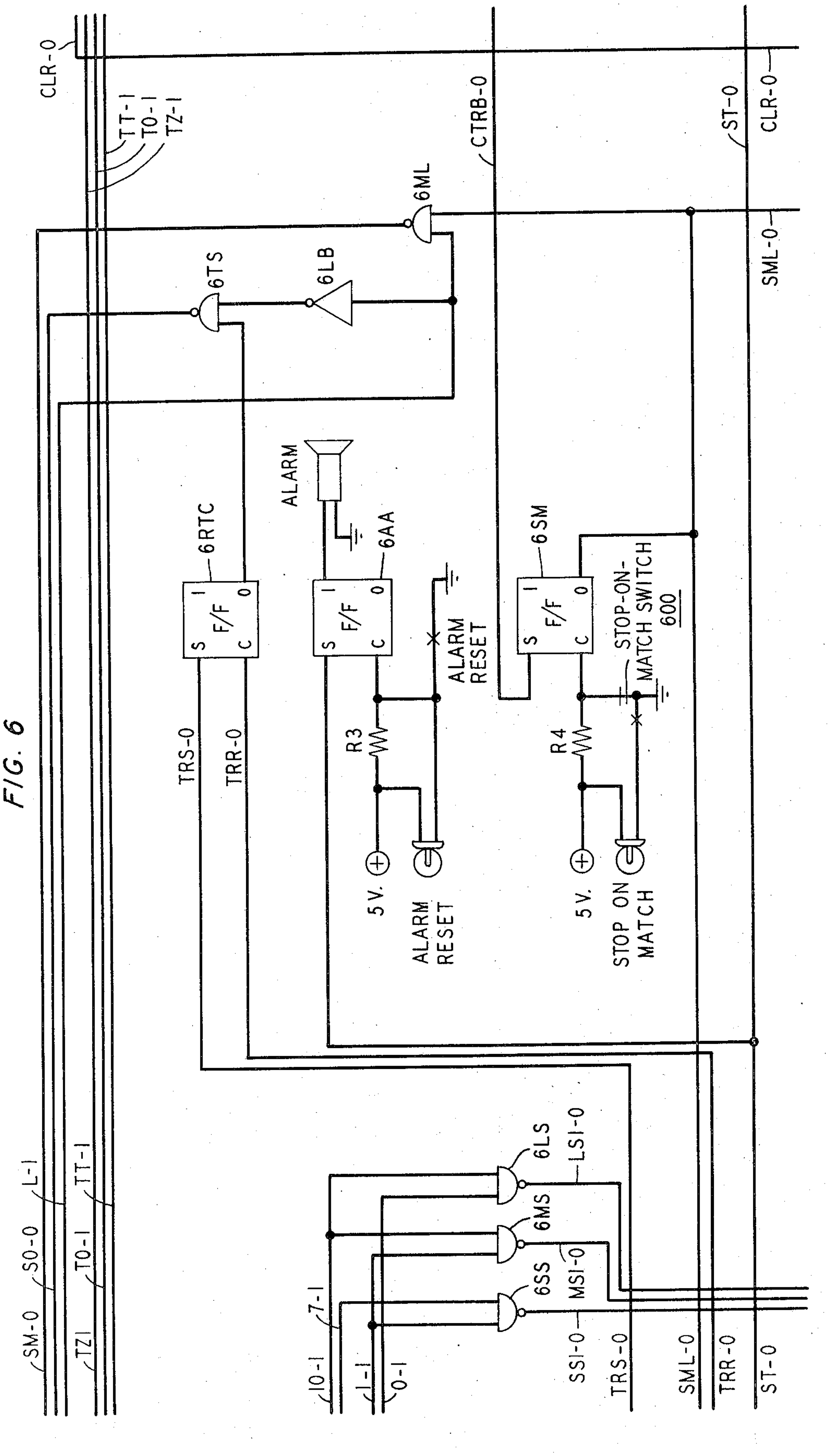

The multifrequency tones representing the data portion of a trouble message are received serially and decoded into an octal code by the circuitry in FIG. 5. The octal code output is then loaded into three shift registers 7TZSR, 7TOSR and 7TTSR in FIG. 7 and when sufficient bits have been received in each register, the entire output of the register is gated to the corresponding latches in one row of the memory matrix. Decade counter 9ADC and its associated circuitry keeps count of the number of bits loaded in the shift registers so that the entire output can be gated at one time. Decade counters 9LCFF, 9MSFF and 9SCFF, along with their associated circuitry, control the entry of information into the appropriate rows in accordance with message length information received along with the data portion of the trouble message.

Each trouble message consists of a data portion which is preceded by a "key pulse" and "message length" signal. The key pulse signal is a special combination of frequencies which prepare the equipment for operation while the message length signal is one of three combinations of special signals which indicate the length of the data portion of the message. The message length signals are used to direct the data signals into the appropriate rows of light emitting diodes. Following the data signals a "start pulse" is transmitted to the trouble analyzer and display to indicate the end of message and to actuate the matching circuitry.

The detailed logic of the trouble analyzer and display is performed by combinations of logic gates, delays, inverters, monopulsers, flip-flops, etc., and the operation and schematic representation of these elements are well-known in the prior art and are described by J. Millman and H. Taub in the textbook "Pulse Digital and Switching Waveforms" 1965, McGraw-Hill Inc. the instant embodiment of the invention utilizes gates in the well-known manner to perform both AND and OR logic functions. In order to differentiate between the functions, those gates performing AND functions with an inverted output are hereinafter referred to as NAND gates and are symbolically shown by the logic symbol of gate 5TT in FIG. 5 of the drawing. Those gates performing OR functions with an inverted output are hereinafter referred to as NOR gates and are set forth in the drawing by the logic symbol utilized for gate 5GT10 of FIG. 5. Where logic symbols are involved, a circle on the output conductor is an indication that a low signal is required to activate the circuit. The absence of a circle is used to indicate that a high signal is required to activate the circuit. The resulting polarity of the circuit output may be determined in the same manner. AND gates and OR gates are shown in the conventional manner such as AND gate 9CLR in FIG. 9 and OR gate 8CD01 in FIG. 8.

Figure 4:
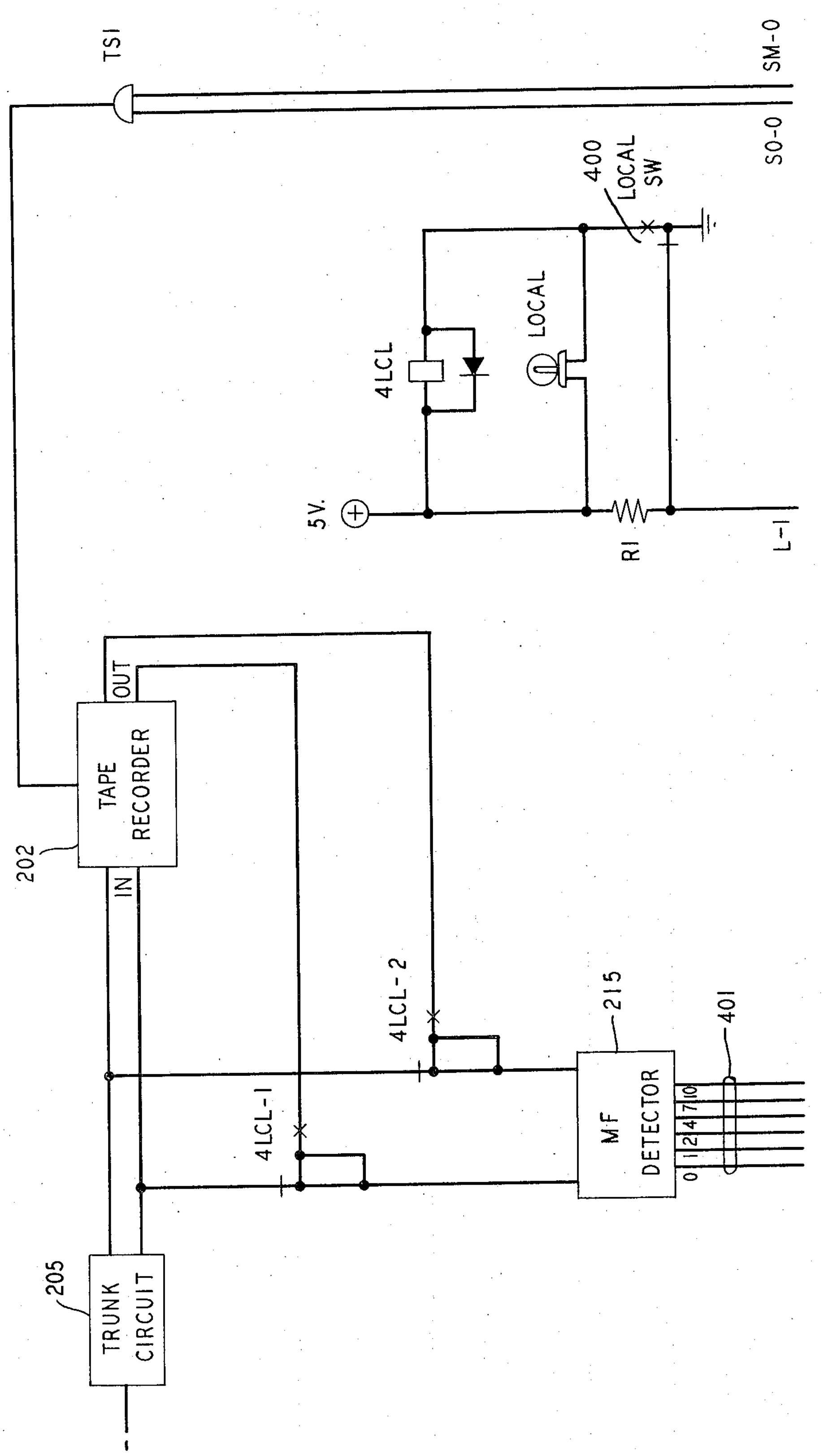
FIGS. 4–14 when arranged according to claim 15, show a more detailed schematic of part of the trouble analyzer and display circuit.

The trouble analyzer and display can be operated in a local or remote mode. In its remote mode, relay 4LCL is released and multifrequency detector 215 in FIG. 4 is connected to trunk circuit 205 to receive trouble messages from the trouble record sender shown in FIG. 1. If local switch 400 is operated, relay 4LCL operates to connect multifrequency detector 215 to tape recorder 202. In either event, multifrequency detector 215 receives the analog signals on a two-out-of-six basis and converts these to direct current signals which are transmitted over conductors 0, 1, 2, 4, 7, and 10 in conductor group 401 to FIG. 5.

With no incoming signals present at multifrequency detector 215, all its output conductors 401 would be in a logical high condition. When two-out-of-six signals are received, the corresponding output conductors in group 401 would go low to enable NAND gate 5IS.

NAND gate 5IS triggers monopulser 5SD whose output goes low for 45 milliseconds after which it remains high. In its transition to logical high, monopulser 5SD triggers monopulser 5DS for 2.5 milliseconds. The combination of one-shot multivibrators 5SD and 5DS provide a 2.5 millisecond "window" 45 milliseconds after the first excursion of gate 5IS and if the signals on conductors 401 are still present, they are considered valid. The output of monopulser 5DS is applied simultaneously to NOR gates 5GT0 through 5GT10 along with only two-out-of-six outputs from multifrequency detector 215.

The two-out-of-six outputs of NOR gates 5GT0 through 5GT10 are then decoded to octal by gates 5DEC1 through 5DEC7, 5TT, 5TO, and 5TZ.

The first signal of the trouble message is the key pulse (KP) signal which is manifested by the enablement of gates 5GT10 and 5GT2. Gates 5GT10 and 5GT2 cause the output of NAND gate 5KPD to go low. The transition of gate 5KPD clears flip-flop 6RTC which will permit the tape recorder to continue running if the local switch 400 is normal. This permits the recorder to record trouble messages from the trouble record sender.

The transition of gate 5KPD also causes gate 5KPA to go low, which in turn causes gate 5KP1 to go low. The output of gate 5KP1 provides a clearing signal on conductor KPA–0. This signal clears flip-flops 8L, 8M and 8S in FIG. 8 and 9TFF in FIG. 9 which are part of the message length decoder, and flip-flop 13MES in FIG. 13 which is part of the match counter circuitry. The output of gate 5KP1 is also transmitted over conductor KPA–1 in FIG. 8 to reset counters 9ADC, 9SCFF, 9MSFF and 9LCFF in FIG. 9 and also to reset match counter 13 ME14 in FIG. 13.

With the reception of the KP pulse at the beginning of a trouble message the signal on conductor KPO gates NAND gates 8LC01 through 8LC24. Gates 8LC01 through 8LC24 transmit pulses over conductors 01C1–1 through 12C1–1 and 01C2–1 through 12C2–1 to simultaneously clock all the bistable latches of the memory matrix in FIG. 10. Since there will be no message input from shift registers 7TZSR, 7TSOR and 7TTSR, all light emitting diodes will be extinguished.

Figures 14, 15:
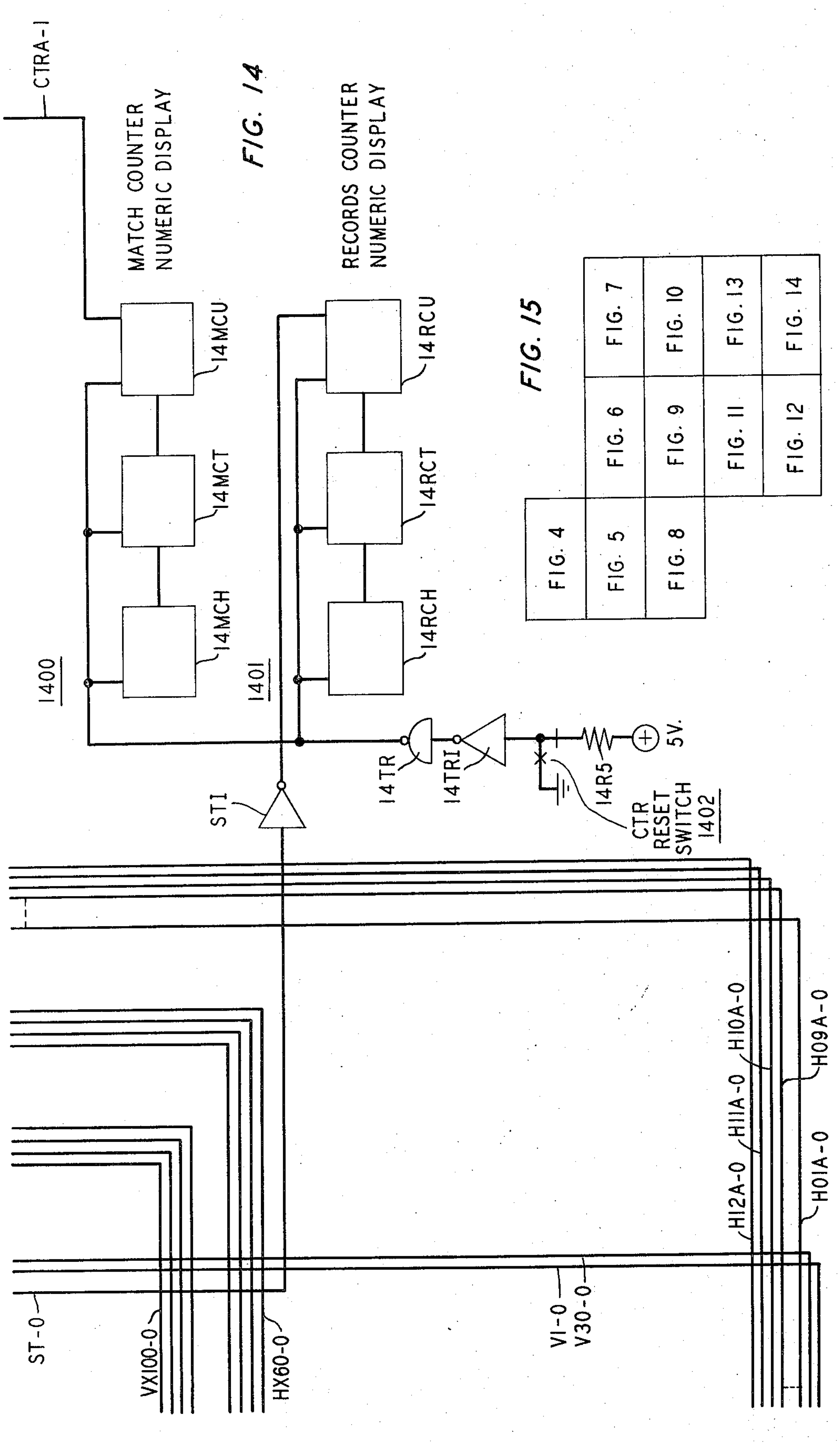

At this time the KP signal has reset the trouble analyzer and display except for the numeric display units in FIG. 14. The trouble analyzer and display is now ready to receive the rest of the trouble message.

The next combination of tones of the trouble message informs the trouble analyzer and display of the message length. There are three message lengths designated long, medium and short and a long message is indicated by the combination of signals on the 10 and 0 conductors in group 401 from MF detector 215. These signals enable gates 5GT10 and 5GT0 which in turn enable long message NAND gate 6LS. iIf a 10 and 1 were received, medium length message gate 6MS would have been enabled and if a 7 and 1 had been received, short length message gate 6SS would have been enabled.

Figure 9:
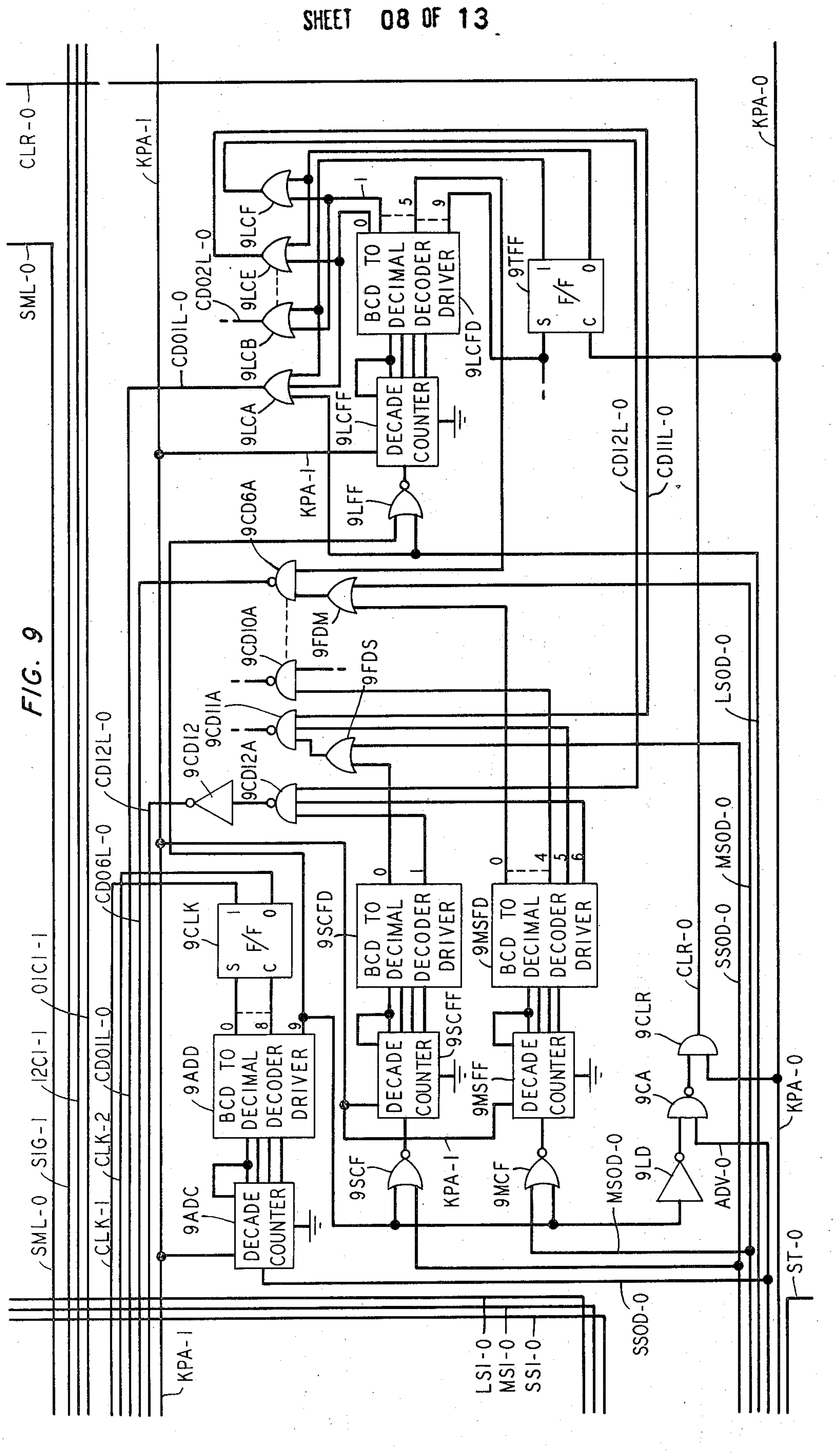
Figure 10:
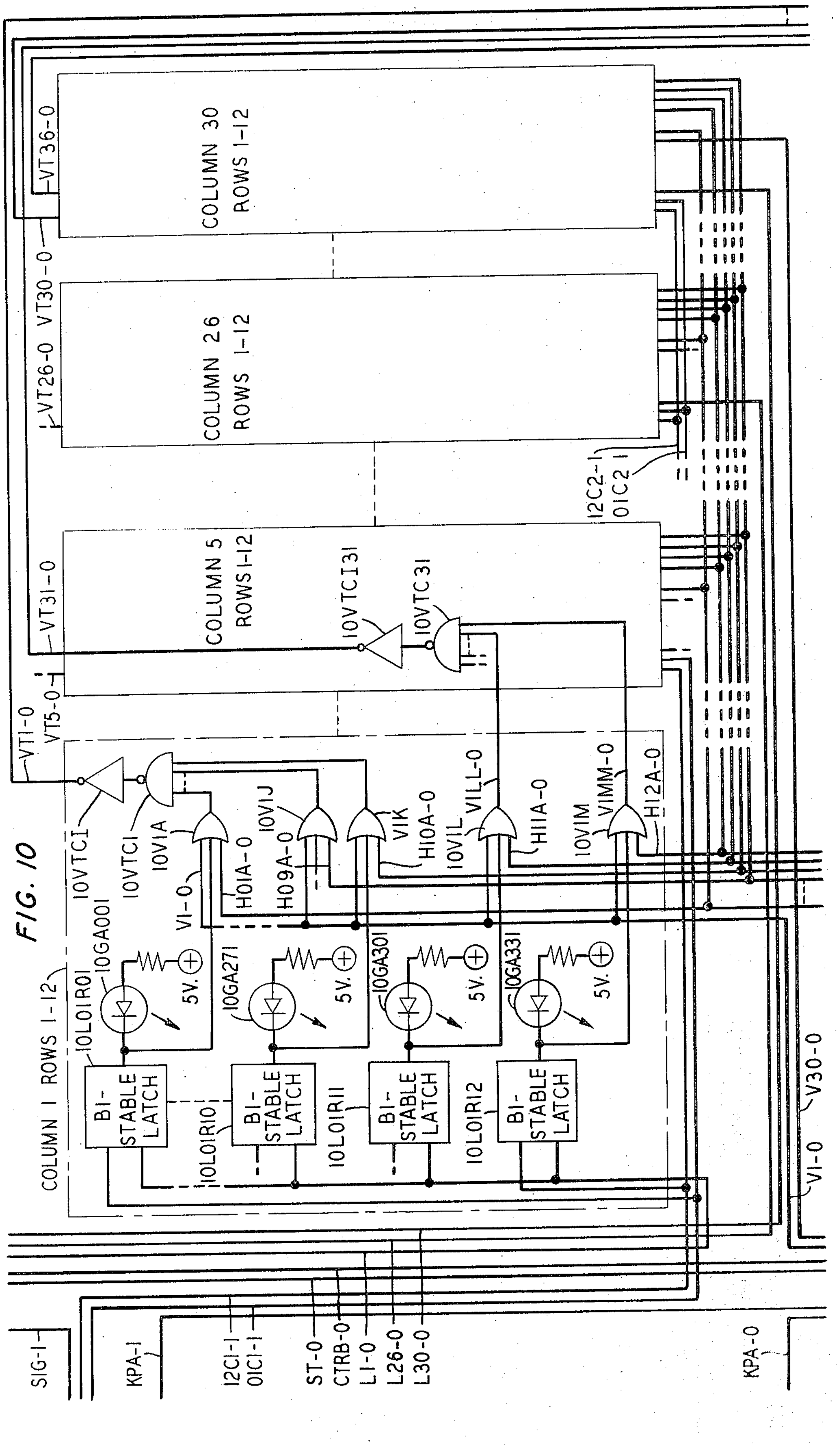

FIG. 9 shows a part of the message length decoder and latch driver circuitry. Decade counter 9ADC is advanced with each data signal of the trouble message and is used to count the number of data signals loaded into shift registers 7TZSR, 7TOSR and 7TTSR. As mentioned above, when all three shift registers are fully loaded with 8 bits, representing the first 24 light emitting diodes in a row, the contents of the shift registers are gated to the matrix The shift registers are then each loaded with the next two bits to energize the remaining six light emitting diodes in the same row.

The other circuitry in FIG. 9 responds to the message length signal to steer the data portion of the message to the appropriate row of light emitting diodes. Counter 9LCFF and its associated decoder driver 9LCFD are used for a long message and steer the initial data signals to the first row of light emitting diodes. Counters 9MSFF and 9SCFF along with their associated circuitry function on the medium and short length messages, respectively. The medium length message counter steers the initial data signals of a trouble message to row 6 while the initial data portion of a short trouble message is steered to row 11 under control of counter 9SCFF.

Let it be assumed that a long message will be received and gate 9LS has been enabled to set flip-flop 8L. Flip-flop 8L signals over conductor LSOD–0 to prepare NOR gates 9LCA and 9LFF and decade counter 9LCFF for subsequent operation.

Figure 7:
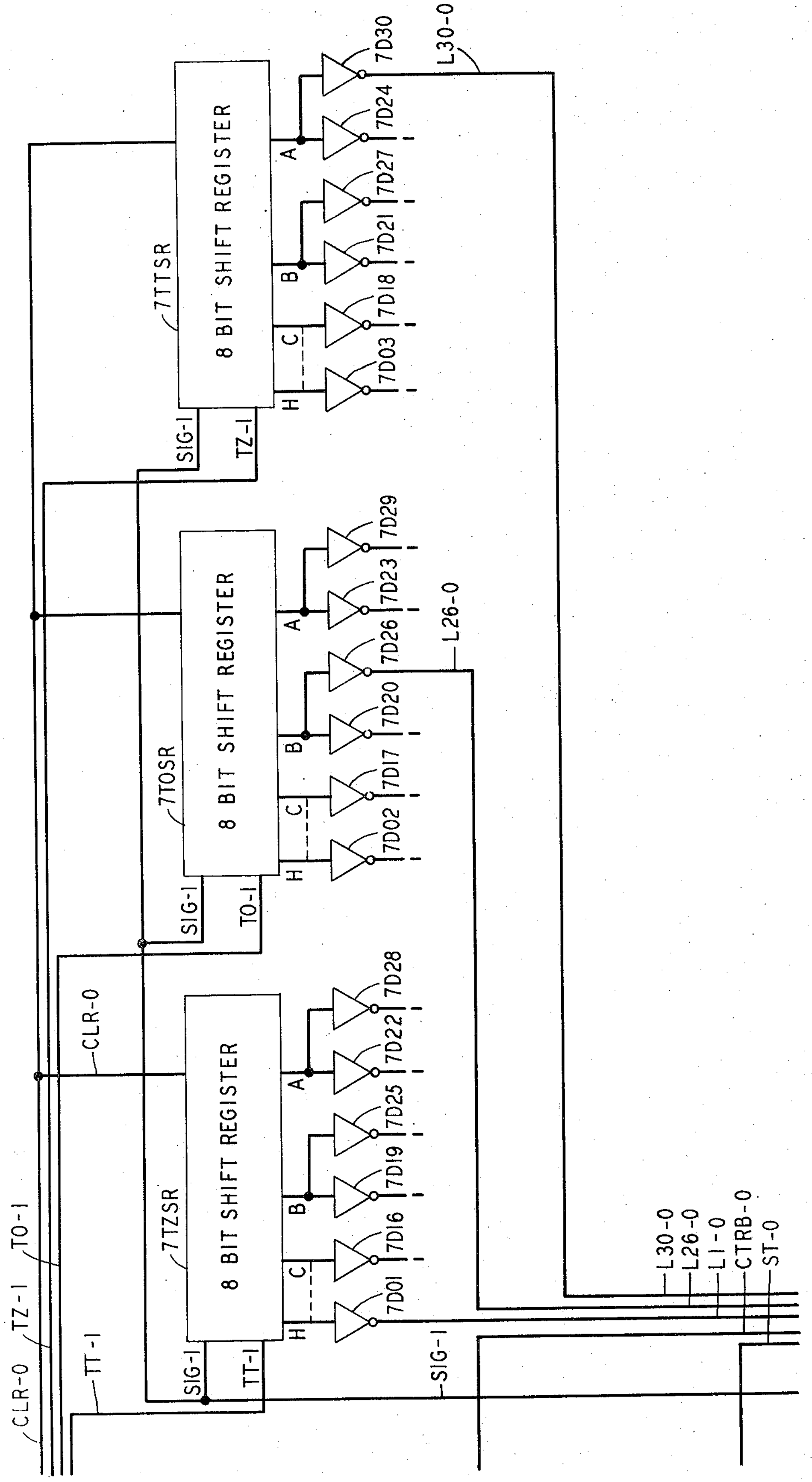
Figure 8:
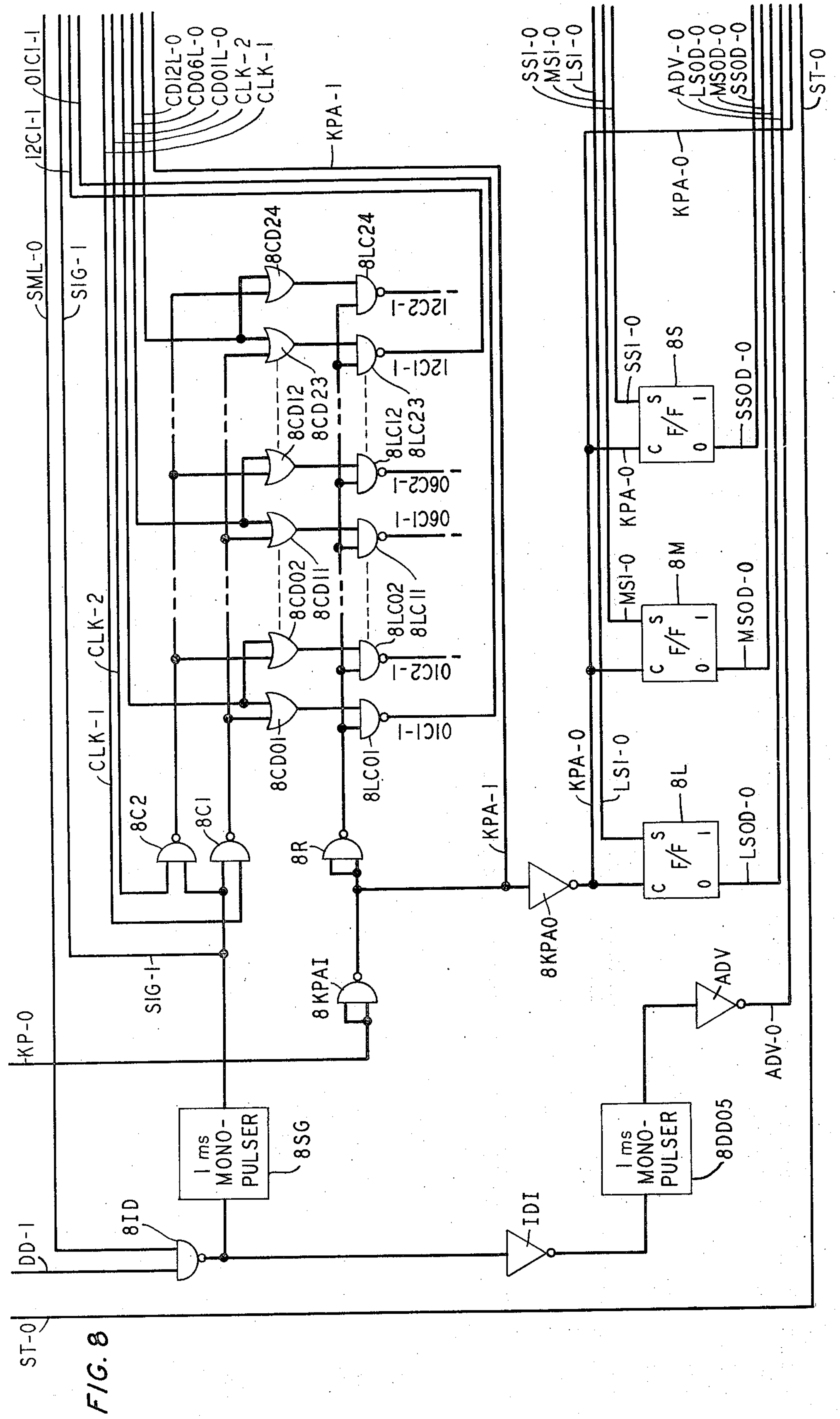

Following the message length code will be the data portion of the trouble message. A long message consists of a series of 120 tones, each of which is a combination of two-out-of-six frequencies representing three bits of information in octal code format. As each tone is detected by multifrequency detector 215, the output of the detector is converted back to octal code by NAND gates 5DEC1 through 5DEC7 and 5TT, 5TO and 5TZ. Thus, if a low signal is transmitted over conductor 0 and 1 in conductor group 401, NAND Gate 5DEC7 would go low and NAND gates 5DEC1 through 5DEC6 would be high. These gates would in turn cause gate 5TZ to go high and gates 5TT and 5TO to be low. The output of NAND gates 5TZ, 5TO and 5TT is transmitted over conductors TZ–1, TO–1 and TT–1 to corresponding inputs of shift registers 7TZSR, 7TOSR and 7TTSR in FIG. 7. Thus, each of the three bits of the octal code is entered in a different one of the shift registers. The three shift registers in FIG. 7 are substantially the same in that they are each 8 bit shift registers and the information in the shift register is shifted from right to left in the presence of a signal on conductor SIG–1. For example, upon the transition of a first signal on conductor SIG–1, the data is transferred to output A. Upon the second signal on conductor SIG–1, the data at output A is transferred to output B and the new data is now on output A. This process continues until the register has received 8 bits of information and has a 0 or 1 on each of its outputs A through H.

The signal on conductor SIG–1 is derived from monopulser 8SG which is triggered when NAND gate 8ID goes low. NAND gate 8ID goes low as long as the stop-on-match flip-flop 6SM is clear and NAND gate 5DD is high, and these conditions exist as a result of the reception of a valid octal code.

When monopulser 8SG is triggered, in addition to advancing the shift registers in FIG. 7, it also provides a clock signal for NAND gates 8C1 and 8C2. Only one of these NAND gates are enabled at a time depending on the position of flip-flop 9CLK in FIG. 9. Since counter 9ADC is at count 0 at the beginning of a trouble message, decoder 9ADD provides an output on its conductor 0 to set flip-flop 9CLK. When flip-flop 9CLK is in its set state, the high signal on conductor CLK–1 and the output of monopulser 8SG will enable NAND gate 8C1.

The OR gates designated 8CD1 through 8CD24 and the associated NAND gates 8LC01 through 8LC24 are sequentially enabled by clock driver signals on conductors CD01L–0 through CD12L–0 which originate in the message length decoder circuitry of FIG. 9. The outputs of each of the odd numbered ones of these gates namely the "C1" conductors 01C1–1 through 12C1–1 are used to clock the latches in columns 1 through 24 in a particular row while each of the even numbered gates provide outputs on the "C2" conductors 01C2–1 through OLC2–1 to actuate the latches in columns 25 through 30 of the corresponding row. In other words, conductors 01C1 and 01C2 are both associated with the latches of row 1 while conductors 02C1 and 02C2 are associated with row 2, etc.

It can be seen that flip-flop 9CLK in FIG. 9 remains in a set condition when decade counter 9ADC is counting from its 0 state to count 7. When decade counter 9ADC reaches count 8, flip-flop 9CLK is cleared and transmits a signal over conductors CLK–2 to enable gate 8C2. With gate 8C2 enabled, the clock driver pulses on conductors CD01L–0 through CD12L–0 can sequentially enable the even numbered 8CD– and 8LC– gates.

Decade counter 9ADC is advanced by a signal on conductor ADV-O as a result of the triggering of monopulser 8DDO5 and this monopulser is triggered for each valid data signal of the trouble message as indicated by the enablement of gate 5DD.

Decade counter 9ADC will continue to count the data signals until the count of 9 is recorded indicating that sufficient data has been received to fill one row of the matrix and the circuitry must be advanced to steer the next ten data signals to the second row of the matrix. This is accomplished by the count 9 output of the decoder driver 9ADD being coupled to NOR gates 9LFF, 9MCF and 9SCF which will advance their respective counters depending upon whether a long medium or short message is being received. In the example being discussed, NOR gate 9LFF is enabled because flip-flop 8L had been previously set by the message length code. When NOR gate 9LFF is enabled, it advances decade counter 9LCFF causing decoder 9LCFD to transfer its output signal from output conductor 0 to output conductor 1 thereby enabling OR gate 9LCB and disabling OR gate 9LCA.

When OR gate 9LCA was enabled it provided a clock driver signal over conductor CDO1L–O to enable gate 8CDL1 or 8CDO2 thus furnishing a signal over conductor 01C1–1 or 01C2–1 to enable all of the latches in the first row of the matrix. Wih the enablement of OR gate 9LCB, OR gates 8CDO3 and 8CDO4 (not shown) associated with the latches of the second row can now be enabled under control of decade counter 9ADC and gates 8C1 and 8C2. When the latches in the second row are enabled the information stored in the shift registers of FIG. 7 will be gated through, to selectively energize the corresponding light emitting diodes of the matrix.

Summarizing the entry of the data signals into the memory matrix, it will be recalled that each data signal of the trouble message is received in the form of two-out-of-six tones which are decoded by circuitry in FIG. 5 into an octal code. The octal code is represented by high and low signals on the three conductors TZ–1, TO–1 and TT–1. Each of these conductors is connected to the input of a corresponding shift register in FIG. 7. The combination of signals on these conductors also provides a clocking pulse and an advance pulse by triggering the respective 8SG and 8DD05 monopulsers in FIG. 8. Monopulser 8SG causes the shift registers in FIG. 7 to shift with each data signal until the registers are full. The registers are determined full by counting the advance pulses using decade counter 9ADC. During the first eight pulses flip-flop 9CLK is set by counter 9ADC and one of the odd numbered latch clock gates 8LC– is enabled to actuate the first 24 latches in an associated row. The particular 8LC gate and its associated row are determined, of course, by the setting of one of the row decade counters 9LCFF, 9MSFF or 9SCFF. When counter 9ADC reaches a count of 8 indicating that the shift registers are full, flip-flop 9CLK is cleared and one of the even numbered latch clock gates 8LC– is enabled. The eight bit shift registers continue counting the next two data signals by reusing their first two stages (A & B). The outputs of these stages are gated to latches 25 through 30 in the row determined by the even numbered latch clock gate 8LC–.

When decade counter 9ADC reaches a count of 9 indicating all data signals for a given row have been received, the appropriate counter 9LCFF, 9MSFF or 9SCFF is advanced to steer the next ten data signals to the next row of latches.

The remaining data signals of the trouble message are stored on the appropriate rows of light emitting diodes in the same manner until the end of the message signal is received. The end of the message signal is a start pulse which enables gates 5GT7 and 5GT10. With both these gates enabled NAND gate 5STD goes low to set alarm flip-flop 6AA over conductor STO. Flip-flop 6AA actuates an alarm to indicate that a trouble message has been received.

NAND gate 5KPB will also be gated at this time by gate 5STD to set flip-flop 6RTC.

MATCHING ARRANGEMENT

The trouble analyzer on display is arranged to signal the maintenance personnel when a particular trouble is received.

The circuitry can be set to "stop on match," that is, to block the further display of trouble messages when the selected trouble is detected, or merely to make a record of how many times a particular trouble message was received.

Figure 11:
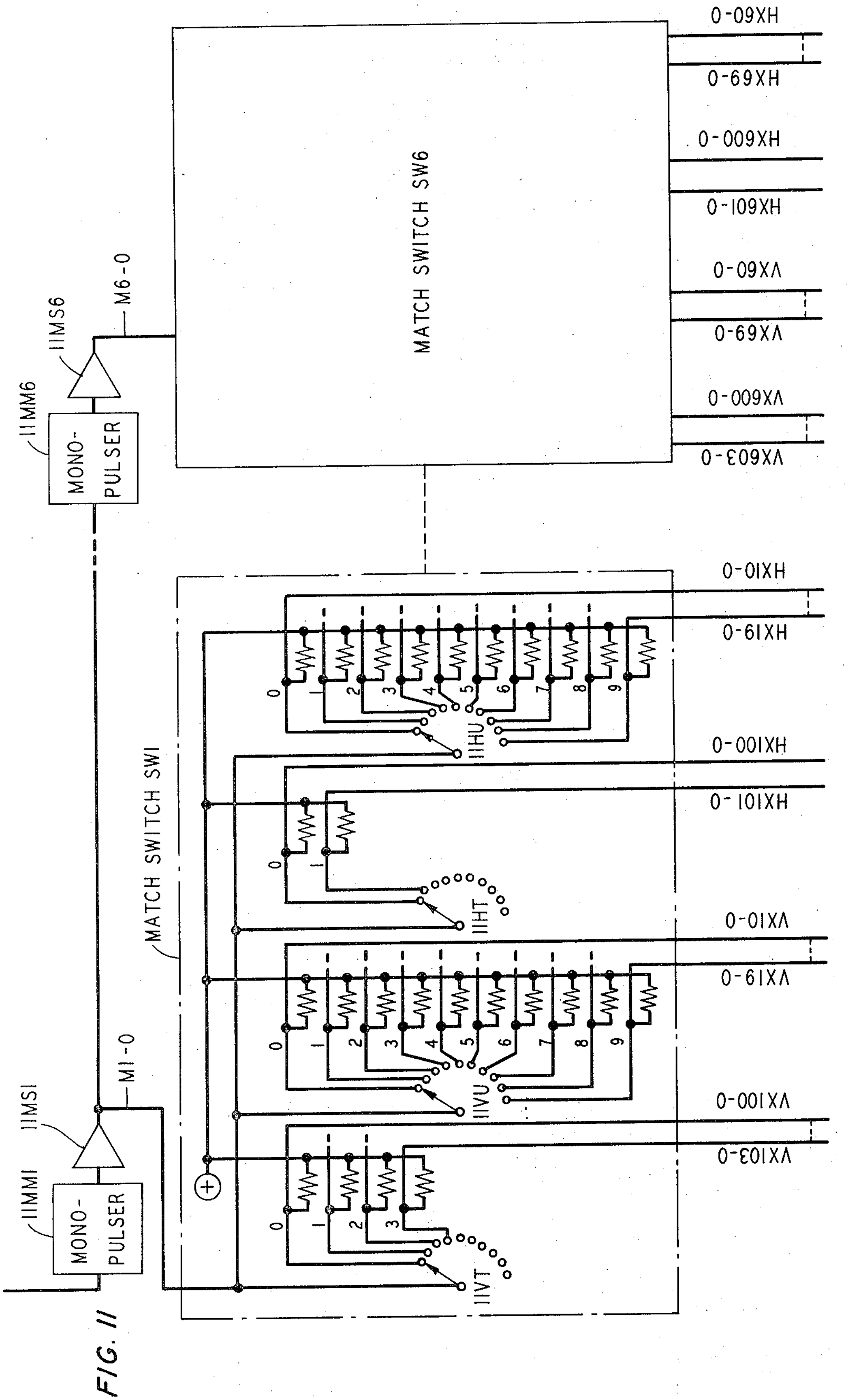
Figure 12:
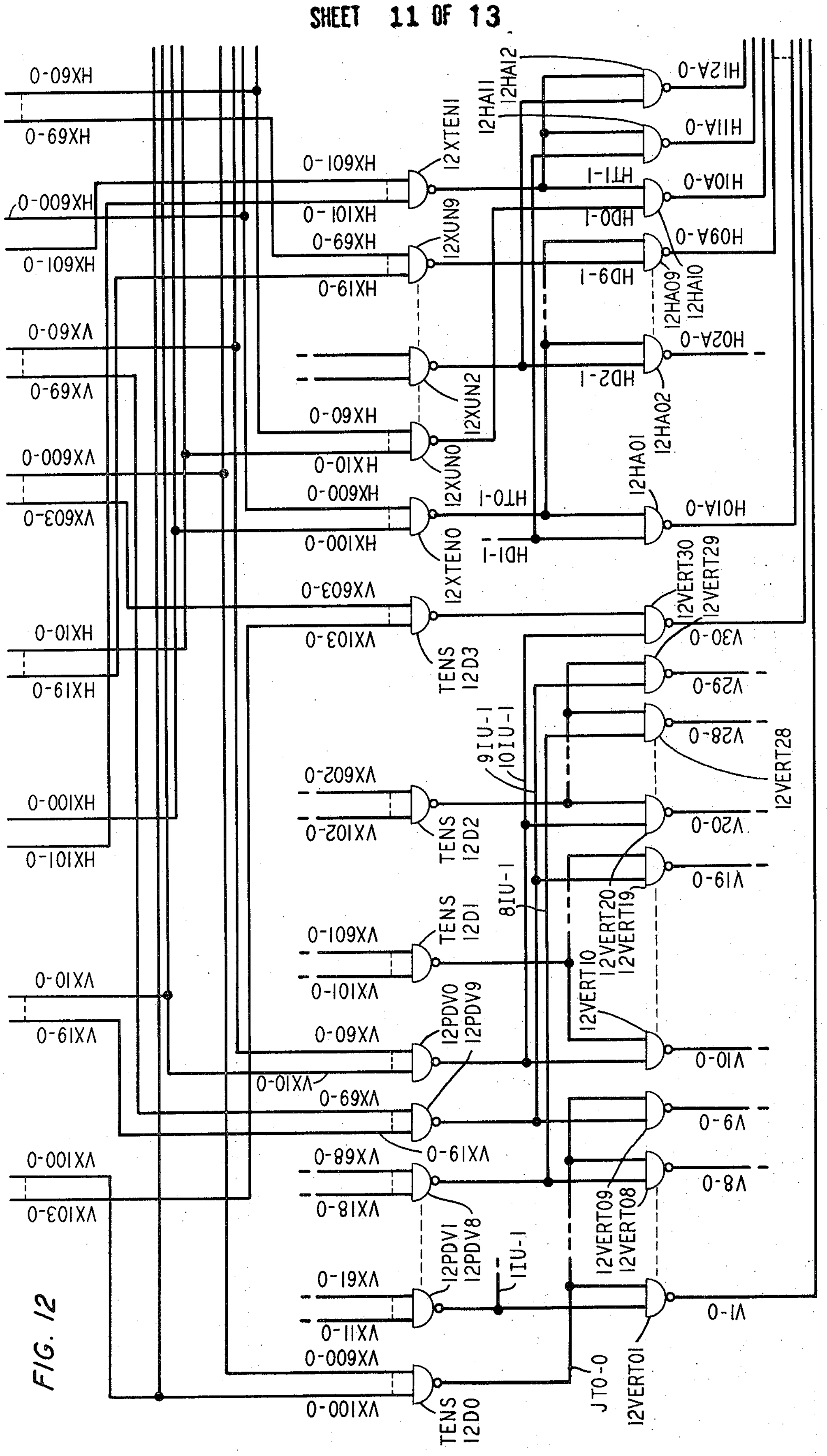
Figure 13:
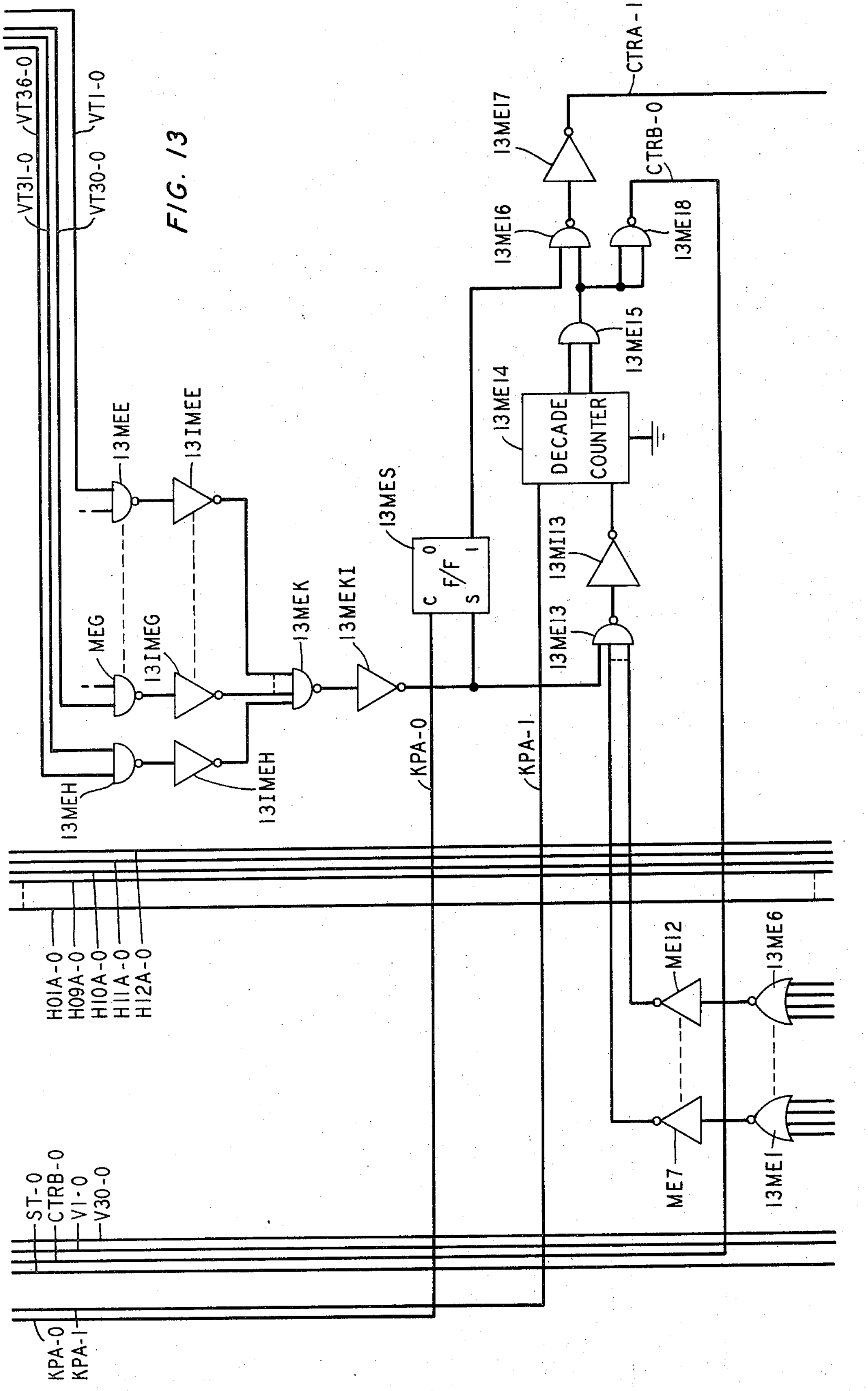

A particular trouble is designated by selecting a plurality of light emitting diodes which are peculiar to that trouble. For example, if a certain marker circuit in the switching system was suspected of causing trouble, the light emitting diodes identifying that marker would be selected. The selection is accomplished by setting each of the six sets of matching switches two of which are shown in FIG. 11. When each switch is set, it designates the horizontal vertical coordinates of one of the light emitting diodes of the matrix.

Thus, if the light emitting diode in the last column of the last row is energized for the particular trouble being designated, switch 11VT would be set at 3 and switch 11VU would be set at 0 to indicate column 30 and switch 11HT would be set at 1 while switch 11HU would be set at 2to indicate row 12. If less than all switches are required to designate a particular trouble, the unused switches must be set at 0.

Associated with each switch is a monopulser 11MM- and these monopulsers are sequentially triggered at the end of a trouble message to interrogate the rotary switches in succession.

The output conductors of the rotary switches are connected through NAND gates 12D–, 12PDV–, 12XTEN– and 12XUN– which decode the tens and units designations for the coordinates into a 1 out of 30 indication (12VERT–) for the verticals or columns and a 1 out of 12 indication (12HA–) for the horizontals or rows.

Returning now to the description of operation it will be recalled that a start pulse is received at the end of each message to enable NAND gate 5STD which transmits a signal over conductor ST–0 to FIG. 11 to trigger monopulser 11MM1 associated with match switch 11SW1.

The output of monopulser 11MM1 is inverted by inverter 11MS1 and transmitted through the rotary switches of match switch SW1 to enable NAND gates 12D–, 12PDV–, 12XTEN– and 12XUN– in accordance with the particular setting of the switches. If it is assumed that the selected light emitting diode is in column 30 of row 12 then NAND gates 12D3, 12PDVO 12XTEN1 and 12XUN2 (not shown) would be enabled thus enabling NAND gates 12VERT30 and 12HA12.

Monopulser 11MM1 also triggers the monopulser associated with match switch 2 (not shown) which in turn triggers the next monopulser and so on until all six monopulsers have been triggered. As each monopulser is triggered a selected vertical and horizontal NAND gate is enabled and the output of these gates is matched with the associated light emitting diode of the matrix. The matching circuit for the light emitting diode in column 30 of row 12 has not been shown but it is similar to the circuitry in FIG. 10 for the light emitting diode in column 1 row 1. For example, OR gate 10V1A will only go low if all three of its inputs are low. This occurs if latch 10L0101 energizes light emitting diode 10GA001 and if one of the six rotary switches in FIG. 1 is set to row 1, column 1, thus transmitting a low signal over conductors V1–0 and HO1A–0. In other words, a match occurs if the setting on one of the rotary switches has selected a light emitting diode that has been energized by the trouble message. Any match condition will set flip-flop 13MES and advance counter 13ME14. For the rotary switches that are set at zero and not to a setting which will pick a particular light emitting diode, a corresponding NOR gate 13ME1 through 13ME6 will be enabled to advance decade counter 13ME14.

AND gate 13ME15 is enabled when decade counter 13ME14 reaches a counter of 6 and NAND gate 13ME16 is enabled from AND gate 13ME15 providing flip-flop 15MES has been set. In other words, NAND gate 13ME16 will only be enabled if all six rotary switches give a match indication even if some of the switches are set to zero. However, if all rotary switches in FIG. 11 are set at zero, flip-flop 13MES will not be set and NAND gate 13ME16 will not be enabled.

Whenever NAND gate 13ME16 is enabled a signal is transmitted over conductor CTRA–1 to advance match counter numeric display 1400. Display 1400 will indicate in hundreds, tens and units, the total number of matches encountered. FIG. 14 also shows a records counter numeric display 1401. This display is advanced with the start pulse at the end of each trouble message and keeps a record of the total number of messages received. Both counters can be reset by the actuation of counter reset switch 1402.

The output of NAND gate 13ME15 also gates NAND gate 13ME18 which signals over conductor CTRB–0 to set flip-flop 6SM providing the stop-on-match switch 600 is actuated. With flip-flop 6SM set, NAND gates 5KP1 and 5KP2 are prevented from being enabled by a key pulse signal at the beginning of the next trouble message. The trouble indication is therefore locked-in on the light emitting diode matrix display and can be released by restoring the stop-on-match switch 600 to normal and actuating the master reset switch 500 in FIG. 5. If the stop-on-match switch is normal the display will also be released upon the reception of a key pulse signal preceding the next trouble message.

In summary, it can be seen from the preceding description that the trouble conditions in a telephone switching system are converted to multifrequency signals for transmission to a trouble analyzer and display unit which can be located with the switching system or at a remote location. The trouble analyzer and display unit receives multifrequency signals representing the status of the telephone equipment and selectively energizes a plurality of light emitting diodes in a memory matrix to visually display the trouble condition. Furthermore, the unit can be arranged to recognize particular troubles by actuating a plurality of switches which select light emitting diodes that are peculiar to the designated trouble. At the end of each trouble message the switches are sequentially interrogated to determine if the setting on each switch matches an energized light emitting diode. If a sufficient number of matches are counted the display is locked in and the reception of further trouble messages is blocked.

What is claimed is:

1. Trouble analyzing apparatus for use in a telephone system comprising means for receiving tone bursts indicative of the status of units of telephone equipment, a memory having a plurality of memory cells for recording indicia corresponding to said tone bursts, a plurality of switching means for designating particular ones of said memory cells for interrogation, means for sequentially energizing said switching means to detect the presence of indicia in the particular memory cell designated by each said switch means, and means effective when indicia is detected in a predetermined number of said memory cells for blocking the further recording of indicia in said memory.

2. The apparatus defined in claim 1 wherein said receiving means comprises means for converting each said tone burst into a plurality of input signals and wherein said memory also comprises register means for storing a plurality of successively received ones of said input signals and means for selectively steering the output signal of said register means to said memory cells.

3. The apparatus defined in claim 2 wherein said memory cells are arranged in columns and rows, wherein said register means comprises a plurality of outputs each corresponding to the memory cells of one of said columns, wherein said steering means comprises first circuit means for controlling the number of output signals transmitted to a particular row of said memory cells and second circuit means for selecting the particular row of said memory cells to which said output signals are to be transmitted.

4. The apparatus defined in claim 3 wherein said second circuit means comprises a plurality of gating means each for coupling a corresponding row of memory cells to said register means and row counter means for selectively enabling said gating means, and wherein said first circuit means comprises column counter means for counting the number of input signals received by said register means and means responsive to a particular count of said column counter means for advancing said row counter means.

5. The apparatus defined in claim 4 wherein said row counter means comprises a plurality of message length counters each for selectively enabling a different number of said gating means in accordance with the number of tone bursts to be received, and wherein said receiving means comprises decoder means responsive to a particular one of said tone bursts representing the number of other tone bursts to be received for activating only a selected one of said message length counters.

6. The apparatus defined in claim 1 wherein each said memory cell comprises first indicating means responsive to said tone bursts for providing a visual indication and second indicating means jointly responsive to said first indicating means and said switching means for transmitting a matching signal to said blocking means.

7. The apparatus defined in claim 6 wherein said receiving means comprises gate means effective when enabled for controlling the recording of said indicia in said memory cells, wherein said blocking means comprises match counter means for counting said matching signals and means effective when said match counter means reaches a particular counting state for disabling said gate means.

8. The apparatus defined in claim 1 wherein said energizing means comprises means for generating a plurality of serially related pulses for triggering each said switching means in succession.

9. The apparatus defined in claim 8 wherein said generating means comprises a plurality of timing devices arranged in cascade whereby each said timing device is associated with a corresponding one of said switching means and means interconnecting said timing devices and said switching means so that each timing device transmits one of said triggering pulses to said associated switching means and to a succeeding one of said timing devices.

10. The apparatus defined in claim 1 wherein said memory comprises a coordinate matrix including groups of intersecting coordinates having a latch circuit and one of said memory cells at each coordinate intersection thereof, and wherein each said switching means comprises first switch means for designating any one of a first group of said coordinates and second switch means for designating any one of a second group of said coordinates which intersect said first group coordinates.

11. The apparatus defined in claim 2 wherein said register means comprises a shift register associated with each of said input signals, wherein each said memory cell comprises visual indicating means and latch circuit means for gating output signals of each said shift register to said visual indicating means, and wherein said steering means comprises means for selectively enabling said latch circuit means.

12. The apparatus defined in claim 11 wherein each said visual indicating means comprises a light emitting diode.

13. The apparatus defined in claim 2 wherein said memory cells comprise a plurality of bistable devices arranged in intersecting rows and columns and wherein each said switching means comprises a first selector switch for selecting any one of said rows and a second selector switch for selecting any one of said columns.

14. The apparatus defined in claim 13 wherein said receiving means comprises first gate means effective for controlling the recording of indicia in said memory, wherein each said switching means also comprises means for transmitting an interrogating signal to a designated one of said memory cells in accordance with the setting of said first and second selector switch means, wherein each said memory cell comprises second gate means jointly responsive to said interrogating signal and said output signal for transmitting a matching signal to said blocking means, and wherein said blocking means comprises counter means effective upon the receipt of a predetermined number of said matching signals for disabling said first gate means.

15. The apparatus defined in claim 14 wherein each said switching means also comprises means for transmitting a signal directly to said counter means to advance said counter means independently of said matching signals.

16. In a telephone system, means for recording in memory a plurality of first signals representing the status of units of telephone equipment, tape recording means, means for interrogating said memory means and responsive to said first signals for transmitting a plurality of multifrequency signals to said tape recording means, and a trouble analyzer and display for controlling said tape recorder means, said analyzer and display comprising a coordinate matrix of visual display devices, means responsive to said multifrequency signals for selectively energizing said devices to visually display the status of said equipment manifested thereby, a plurality of selector switches each operable to select any one of said devices, means responsive to the last received one of said multifrequency signals for sequentially activating said selector switches, means jointly effective when one of said switches is activated and the said device selected thereby is energized for generating a matching signal, and means responsive to a predetermined number of said matching signals for signaling said tape recording means.

17. The invention defined in claim 16 wherein said analyzer and display comprise means responsive to a first received one of said multifrequency signals for deenergizing all said devices.

18. The invention defined in claim 17 wherein said analyzer and display also comprises means responsive to said signaling means for blocking the operation of said deenergizing means.

19. The invention defined in claim 17 wherein said devices are arranged in a plurality of rows and wherein said analyzer and display further comprise means responsive to an intermediate one of said multifrequency signals for causing said energizing means to energize a row corresponding to said intermediate signal.

20. An arrangement for recording trouble conditions in a telephone system comprising trouble recording means responsive to said switching system for recording in a first memory indications of the status of said telephone system, sender means for interrogating said first memory and converting the indications recorded therein into a plurality of tones, trouble analyzing means and means for transmitting said tones to said trouble analyzing means, said trouble analyzing means comprising a plurality of memory cells each having a visual indicator, means for decoding received ones of said tones into signals for selectively energizing said memory cells in accordance with said received tones, a plurality of means each actuable for designating at least one of said memory cells for interrogation, means for energizing each said designating means in succession, means jointly responsive to the actuation of one of said selecting means and the energization of the memory cell designated thereby for generating a matching signal, and means actuated upon the counting of a predetermined number of said matching signals for blocking the decoding of additional ones of said tones.

21. Trouble analyzing apparatus for use in a tlephone system comprising means for receiving tone bursts indicative of the status of units of telephone equipment, a memory including a plurality of memory cells for recording indicia corresponding to said tone bursts, a plurality of switching means each operable for designating a particular one of said cells, means for sequentially energizing said switching means, a plurality of circuit means each actuated in the presence of indicia in a cell designated by one of said switching means, and means effective when a predetermined number of said circuit means are actuated for blocking the further recording of indicia in said memory cells.

* * * * *

UNITED STATES PATENT OFFICE
CERTIFICATE OF CORRECTION

Patent No. 3,816,674 Dated June 11, 1974

Inventor(s) S.S.Andrews, Jr.-L. Gawron, Jr.-G.J. Meidl

It is certified that error appears in the above-identified patent and that said Letters Patent are hereby corrected as shown below:

On Abstract page, filing date "August 8, 1973" to March 8, 1973.

Column 2, line 24, change "claim" to --FIG.--;

line 50, change "relay" to --relays--.

Column 3, line 36, change "101" to --102--.

Column 13, line 1, change "10L0101" to --10L01R01--.

Column 14, line 8, change "switch" to --switching--.

Signed and sealed this 29th day of October 1974.

(SEAL)
Attest:

McCOY M. GIBSON JR.
Attesting Officer

C. MARSHALL DANN
Commissioner of Patents